(12) United States Patent
Hill et al.

(10) Patent No.: US 7,664,932 B2
(45) Date of Patent: Feb. 16, 2010

(54) SCALABLE AND CONFIGURABLE EXECUTION PIPELINE OF HANDLERS HAVING POLICY INFORMATION FOR SELECTIVELY ACTING ON PAYLOAD

(75) Inventors: David P. Hill, Redmond, WA (US); Benjamin S. Wulfe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 11/735,087

(22) Filed: Apr. 13, 2007

(65) Prior Publication Data

US 2008/0256342 A1 Oct. 16, 2008

(51) Int. Cl.
*G06F 9/38* (2006.01)
(52) U.S. Cl. .................... 712/201; 345/506; 712/220
(58) Field of Classification Search .................. None
See application file for complete search history.

(56) References Cited

U.S. PATENT DOCUMENTS

| | | | |
|---|---|---|---|
| 5,287,467 A | | 2/1994 | Blaner et al. |
| 5,303,375 A | * | 4/1994 | Collins et al. ............... 718/100 |
| 5,421,015 A | * | 5/1995 | Khoyi et al. ................. 718/107 |
| 6,157,935 A | | 12/2000 | Tran et al. |
| 6,263,396 B1 | | 7/2001 | Cottle et al. |
| 6,421,730 B1 | | 7/2002 | Narad et al. |
| 6,807,626 B1 | | 10/2004 | Cofler et al. |
| 6,934,832 B1 | | 8/2005 | Van Dyke et al. |
| 7,020,765 B2 | | 3/2006 | Nguyen et al. |
| 7,143,247 B1 | | 11/2006 | Grossier |
| 7,162,610 B2 | | 1/2007 | Nguyen et al. |
| 2003/0163675 A1 | | 8/2003 | Bennett et al. |
| 2004/0042470 A1 | | 3/2004 | Cooper et al. |
| 2004/0186915 A1 | * | 9/2004 | Blaszczak et al. ........... 709/246 |
| 2006/0184779 A1 | | 8/2006 | Pisek et al. |
| 2006/0274971 A1 | * | 12/2006 | Kumazawa et al. ......... 382/276 |
| 2007/0028078 A1 | | 2/2007 | Harris et al. |

OTHER PUBLICATIONS

Li, Yamin, et al., "Design and Implementation of a Multiple-Instruction-Stream Multiple-Execution-Pipeline Architecture", Seventh International Conference on Parallel and Distributed Computing and System, Oct. 19-21, 1995, Washington, D.C, pp. 477-480.
Callahan, Timothy J., et al., "Adapting Software Pipelining for Reconfigurable Computing", Cases' 00, Nov. 17-19, 2000, San Jose, CA.
Ranawerra, Samantha, et al., "Scheduling of Periodic Time Critical Applications for Pipelined Execution on Heterogeneous systems", 2001 IEEE, pp. 131-138.

* cited by examiner

*Primary Examiner*—Kenneth S Kim
(74) *Attorney, Agent, or Firm*—Workman Nydegger

(57) ABSTRACT

Optimizing pipeline handler execution. A method may be practiced in a computing environment including an execution pipeline. The method includes acts to optimize execution of handlers in the pipeline. The method includes receiving a payload object. Policy information about the payload object is referenced. The policy information includes at least one property value. Based on the policy information about the payload object, handlers are selected from among the pipeline to execute on the payload object. The policy information may be referenced by strategies. Handlers may be registered with the strategies to facilitate the strategies being used to select handlers.

14 Claims, 2 Drawing Sheets

SCALABLE AND CONFIGURABLE EXECUTION PIPELINE OF HANDLERS HAVING POLICY INFORMATION FOR SELECTIVELY ACTING ON PAYLOAD

BACKGROUND

Background and Relevant Art

Computers and computing systems have affected nearly every aspect of modern living. Computers are generally involved in work, recreation, healthcare, transportation, entertainment, household management, etc.

In object oriented computer programming, objects may be created and operated on by other objects. In one typical scenario, an object may be operated on by a pipeline. Typical pipelines are defined by a linear list that includes a number of operational objects which operate on payload objects. Payload objects are passed through each of the operational objects with each performing some operation such as changing of properties in the payload object or determining that no operation should be performed on the payload object.

A general purpose pipeline may include a number of linear operational objects for operating on a number of different payload objects. Additionally, the pipeline may be configured such that it includes operational objects that are not intended to operate on every payload object that may be operated on by the pipeline. To facilitate the pipeline execution, contextual data may be passed with the payload object, where the contextual information can be used by an operational object to determine what and if any operations should be performed on the payload object. However, each operational object in the pipeline individually performs operations to evaluate what operations should be performed on the payload object, or if no operations should be performed. In pipelines that are designed for a large number of different types of payload object by including a large number of different linearly organized operational objects, unwanted overhead processing may be performed when operational objects perform operations to determine that no operations should be performed on a particular payload object.

The subject matter claimed herein is not limited to embodiments that solve any disadvantages or that operate only in environments such as those described above. Rather, this background is only provided to illustrate one example of a technology area where some embodiments described herein may be practiced.

BRIEF SUMMARY

One embodiment described herein may be practiced in a computing environment including an execution pipeline. The embodiment includes a method of optimizing execution of handlers in the pipeline. The method includes receiving a payload object. Policy information about the payload object is referenced. The policy information includes at least one property value. Based on the policy information about the payload object, handlers are selected from among the pipeline to execute on the payload object.

In another embodiment, handlers may be registered with strategies in an execution pipeline. For example, a method may be practiced in a computing environment including an execution pipeline. The method includes acts to optimize execution of handlers in the pipeline. The method includes receiving policy information about a handler. The policy information includes at least one property value. The method further includes registering the handler with one or more execution strategies. The one or more execution strategies include the policy information to select handlers in the pipeline to execute on payload objects based on policy information about the payload objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to optimizing pipeline execution. The embodiments of the present invention may comprise a special purpose or general-purpose computer including various computer hardware, as discussed in greater detail below.

Some embodiments are directed to optimizing pipeline operations by pre-selecting which handlers from among a pipeline will be used to execute on a particular payload object. Illustratively, strategies may be developed for handler selection. Strategies are classes that customize the selection and order of handlers executed during pipeline execution. The strategies may include the ability to select handlers based on policy information about a payload object. For example, when handlers are registered with a pipeline, the handlers may indicate policy information describing the payload objects on which the handler should execute. For example, a handler may register for a given value for a given property. Illustrating a specific example, a particular handler may register with a strategy that the handler is to execute on any payload object whose type property has a value of "foo", where foo is an arbitrary nonsensical value used for illustrative purposes only. Alternatively, handlers may be selected for commands specified in the property value, target values, instances, etc.

Figure 1:
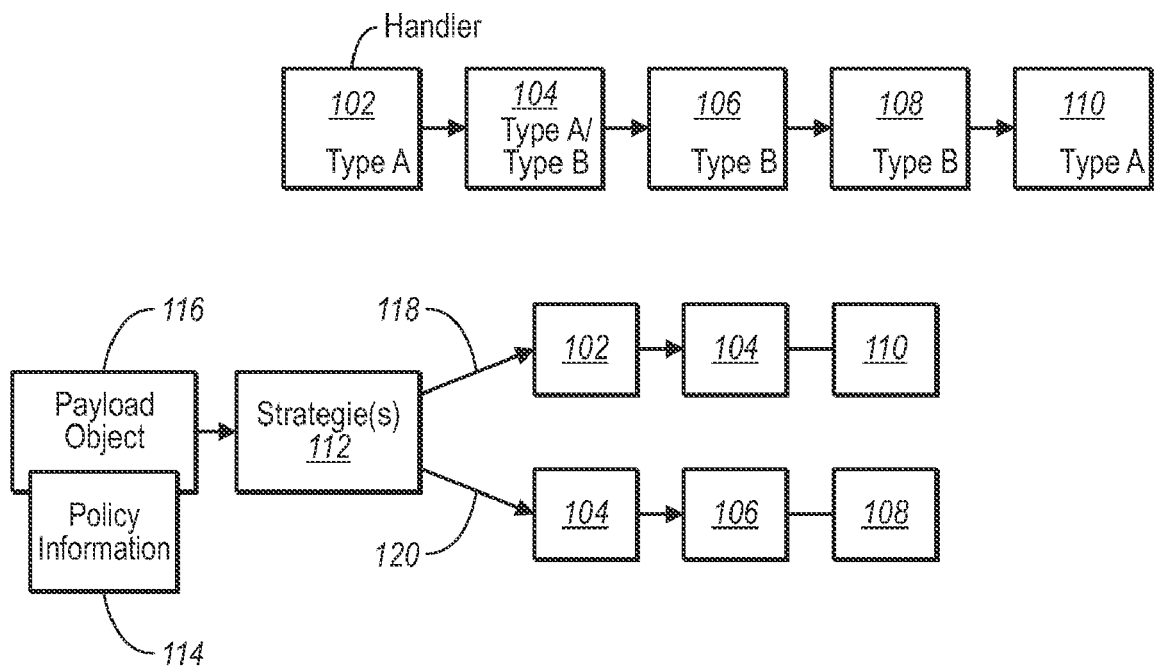
FIG. 1 illustrates an execution pipeline and strategies used for optimizing the execution pipeline.

Referring now to FIG. 1, an example pipeline 100 is illustrated. The example pipeline 100 is shown as including a number of handlers 102, 104, 106, 108, and 110. As indicated in FIG. 1, each of the handlers is intended to execute on a particular type of payload object. For example, handler 102 is configured to execute on payload objects that are of Type A. Handler 104 is configured to execute on payload objects which are of either Type A or Type B. Handler 160 is configured to execute on payload objects that are of Type B. Handler 108 is configured to execute on payload objects which are of Type B. Handler 110 is configured to execute on objects which are of Type A. FIG. 1 further illustrates that a strategy 112 may be implemented to optimize the pipeline by selecting handlers for execution based on policy information 114 about a payload object 116.

For example, as illustrated in FIG. 1, the payload object 116 has associated policy information 114. The policy information 114 may be metadata that is external to the payload object 116 itself. The strategy 112 receives the policy information 114 about the payload object 116. The strategy 112 then determines based on the policy information which handlers will be used to execute on the payload object 116. For example, if the policy information 114 indicates that the payload object 116 is an object of Type A, then the strategy 112 will select a first branch 118 to execute on the payload object 116. The first branch 118 includes handlers 102, 104, and 110. Alternatively, if the policy information 114 indicates that the payload object 116 is an object of Type B, then the strategy 112 will select handlers based on a second branch 120. The second branch 120 includes handlers 104, 106, and 108.

Notably, handlers in the pipeline 100 can change the policy information 114. This allows for subsequent handler selections in the application of various strategies.

Figure 2:
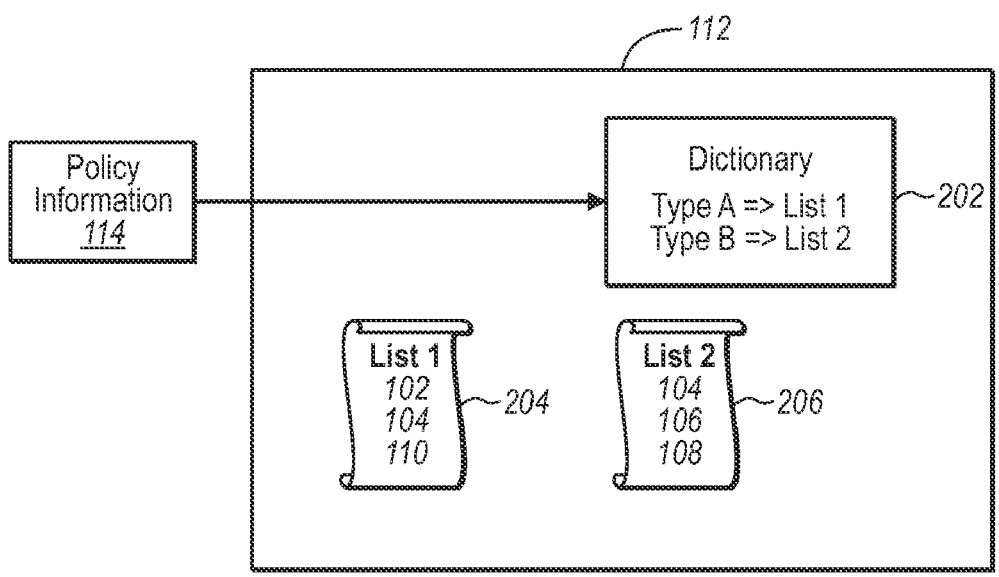
FIG. 2 illustrates a strategy for selecting handlers in an execution pipeline.

Referring now to FIG. 2, an example embodiment of the strategy 112 is illustrated. Notably, strategies may include multiple strategies. For example, this may be accomplished by including references to strategies, where multiple "sub" strategies are used to implement a strategy. For example, the strategy 112 includes three different strategies including a dictionary strategy 202, a first list strategy 204, and a second list strategy 206. Illustrating now the functionality of strategy 112 as shown in FIG. 2, the policy information 114 is provided to the dictionary strategy 202. The dictionary strategy 202 includes provisions for handling two different alternatives for certain policy information. For example, if the policy information 114 indicates that the payload object 116 is of a Type A, then the dictionary specifies that each of the handlers listed in the List 1 strategy 204 should execute on the payload object 116. Alternatively, the dictionary strategy 202 indicates that if the policy information indicates that the payload object 116 is of a Type B, then each of the handlers in List 2 strategy 206 should execute on the payload object 116.

While in the preceding example, the strategies 112 selected handlers based on a property value in the policy information 114 where the property value included type information, other property values may alternatively or additionally used. For example, context properties, such as a user property (e.g. user=admin), security properties, target properties, command properties, or any one of a number of different property values may be used.

As illustrated in FIG. 2 and as previously discussed, various strategies may be implemented. By way of illustration and not limitation, some of the strategies that may be implemented and that will be described herein include Dictionary, Linear, Ordered, Chained, Forked and Component Tree.

A dictionary strategy 202 is illustrated in FIG. 2. The dictionary strategy includes a mapping for facilitating the selection of handlers by specifying handlers for a particular property value from the policy information. For example, if a User property is set to Admin (i.e. User=Admin) then a dictionary strategy may specify that a particular set of handlers are selected for this context. Specifying handlers in the dictionary strategy may be accomplished in a number of different ways. For example, the dictionary strategy may specify explicitly which handlers to select. In an alternative embodiment, the dictionary strategy may specify handlers by reference to other strategies. As illustrated in FIG. 1, the dictionary strategy 202 specifies handlers by reference to List 1 strategy 204 and List 2 strategy 206.

The list strategies 204 and 206 may be implemented as, for example, linear strategies. Linear strategies define handlers that should be selected as a list of handlers ordered in an order for execution on payload objects. For example, a linear strategy may simply include an enumeration of handlers. When the linear strategy is used to select handlers, the handlers selected may simply be those enumerated in the linear strategy.

Another strategy that may be implemented is an ordered strategy. The ordered strategy is similar to the dictionary strategy, except that the ordered strategy executes all entries in a specified order. The ordered strategy defines an order for selected handlers to be executed based on particular property values in the policy information. Additionally, the ordered strategy, as with the dictionary strategy, is generally configured to select handlers based on a single property. While multiple different handler selections may be made for different values of the property, generally only a single property is used for handler selection in the dictionary and ordered strategies. If handler selection is desired for multiple properties, one embodiment allows for a chained strategy to be implemented which chains together a number of other strategies.

Illustrating now an example of an ordered strategy, assume that the dictionary strategy 202 is implemented as an ordered strategy. The strategy specifies that both List 1 and List 2 strategies will be executed and that they will be executed in order. That is, List 1 strategy will select handlers to be executed for Type A payload objects followed by List 2 strategy selecting handlers to be executed for Type B payload object. The ordered strategy selects handlers for every value of a property in an order defined by the ordered strategy.

As noted previously, chained strategies may be implemented. A chained strategy includes two or more strategies coupled together. For example, as illustrated previously, the strategy 112 includes the list strategies 204 and 206 associated with the dictionary strategy 202 by references in the dictionary strategy to the list strategies 204 and 206. As such, strategy 112 is a chained strategy.

In another example, a chained strategy may be used for handler selection based on different properties. For example, a first dictionary strategy may be used to select handlers based on type property values. A second dictionary strategy may be used to select handlers based on user property values. A chained strategy may use the first and second dictionary strategies to select handlers based on both the type and user property values.

Another strategy is a forked strategy. A forked strategy allows for handler selection based on different properties. The forked strategy branches to one or more other strategies based on a particular policy value. For example, one handler may be registered only execute when a policy value "Type"="Foo" to accomplish type filtering in a type filtering strategy. Another handler is registered such that it only executes when "Instance"="fooinstance". This handler is registered using an instance filtering strategy. Because the two are mutually exclusive, the user can use a forked strategy with other policy information to route to one of type filtering strategy or instance filtering strategy based on what needs to execute in the pipeline.

Another strategy is a component tree strategy. Component tree strategies allow for object relationships to be used to determine if handlers should execute on a particular object. For example, a component tree strategy may examine a child or parent object to an object in determining if execution on the object is appropriate. Illustratively, assume that a "File.Save" handler is registered with "TargetInstance"="component1" and "Command"="File.Save". A File.Save handler should therefore execute when the target is component1. If component1 happens to have a child component called componentchild, such that TargetInstance="componentchild", then the File.Save handler will not ordinarily be executed because TargetInstance isn't set to component1. The component tree strategy includes functionality for scanning TargetInstance and walking its parent chain, or in some embodiments child chain, to see if any handler was registered on a parent. In one embodiment, a user can specify whether the component tree strategy walks up or down from a policy property such as TargetInstance. As with other strategies, the component tree strategy is not hard coded to only function with a target policy value, but rather one may specify what policy value to use to start from.

Figure 3:
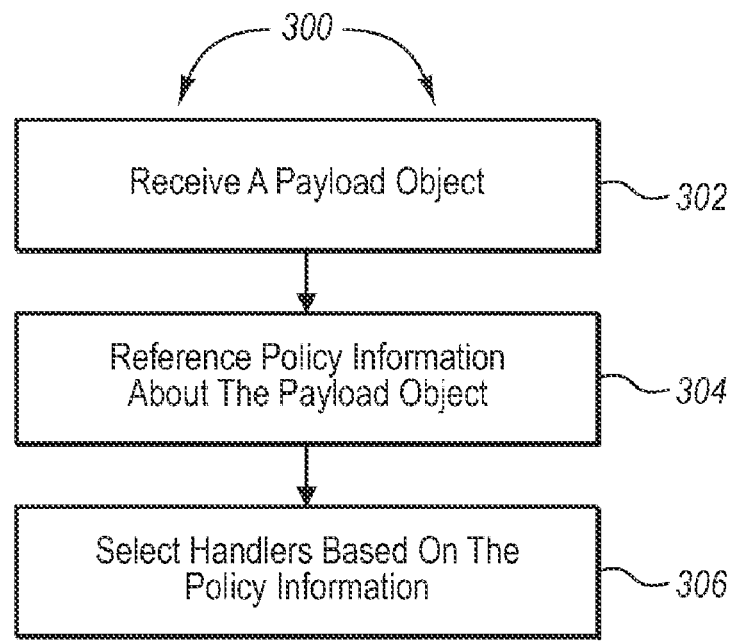
FIG. 3 illustrates a method of selecting handlers from an execution pipeline using strategies.

Referring now to FIG. 3, an exemplary method 300 is illustrated. The method 300 may be practiced, for example, in a computing environment including an execution pipeline. The method includes acts to optimize execution of handlers in the pipeline. The method receiving a payload object (act 302). For example, as illustrated in FIG. 1, a payload object 116 may be received by a module that is able to reference strategies such as strategy 112.

The method 300 further includes referencing policy information about the payload object (act 304). The policy information includes at least one property value. For example, the module that is able to reference strategies may reference policy information 114. As explained previously, the policy information 114 may be external metadata about the payload object 116.

Based on the policy information about the payload object, handlers are selected from among the pipeline to execute on the payload object (act 306). For example, as illustrated in FIG. 1, the strategy 112 may be used to select handlers, such as those in either branch 118 or branch 120.

In one embodiment, after the handlers have been selected, only the selected handlers are executed on the payload object. For example, as illustrated in FIG. 1, the handlers in branch 118 or 120 may execute on payload object 116 as appropriate.

In one embodiment to facilitate the method 300, the policy information is registered in one or more strategies with associated handlers. As noted previously, the strategies define which handlers are selected based on how the policy information is registered in the strategies. The policy information may be registered in the strategies by registering handlers with a strategy. For example, when a handler is registered with a strategy, the handler may have associated policy information. Illustratively, the policy information may indicate that the handler is to be selected for one or more particular property values. Illustrating a particular example, when handler 102 registers with strategy 112, policy information may be included in the registration such that the strategy 112 is aware that handler 102 should execute on objects of Type A.

In one embodiment, at least one of the strategies includes a dictionary strategy. In this embodiment, selecting handlers comprises referencing the dictionary. The dictionary facilitates the selection of handlers by specifying handlers for a particular property value from the policy information. In one embodiment, the dictionary specifies handlers by reference to other strategies. For example, reference to other strategies may include one or more references to one or more lists. The lists include a list of handlers to be executed.

One of the strategies may include an ordered strategy. The ordered strategy defines an order for selected handlers to be executed based on particular property values in the policy information.

In one embodiment, at least one of the strategies may include a number of strategies chained together.

Figure 4:
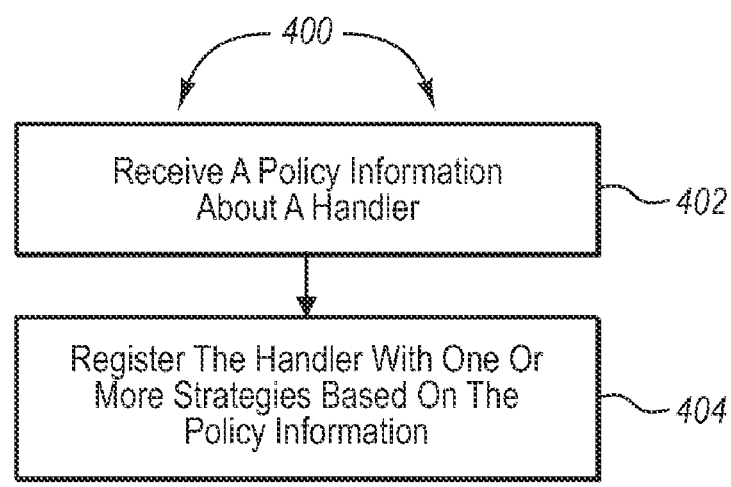
FIG. 4 illustrates a method of registering handlers with strategies.

Referring now to FIG. 4, another method 400 is illustrated. The method 400 includes acts executed in a computing environment including an execution pipeline to optimize execution of handlers in the pipeline. The method 400 includes receiving policy information about a handler (act 402). The policy information includes at least one property value.

The method 400 also includes registering the handler with one or more execution strategies (to seize act 404). The one or more execution strategies include the policy information to select handlers in the pipeline to execute on payload objects based on policy information about the payload objects.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system comprising a computer processor, computer-readable storage, and including an execution pipeline which comprises a plurality of handlers which operate on payload objects, a method of optimizing execution of handlers in the pipeline, the method comprising:

each of the plurality of handlers indicating policy information describing the payload objects on which the each handler should execute;

receiving a payload object;

referencing policy information about the payload object, the policy information including at least one property value;

based on the policy information about the payload object and at least one property value, selecting one or more handlers from among the plurality of handlers within the pipeline; and executing each of the selected one or more handlers on the payload object.

2. The method of claim 1, wherein after the handlers have been selected, executing only the selected handlers on the payload object.

3. The method of claim 1, wherein the policy information is registered in one or more strategies with corresponding handlers, wherein the strategies define which handlers are selected based on how the policy information is registered in the strategies.

4. The method of claim 3, wherein at least one of the strategies comprises a dictionary, and wherein selecting handlers comprises referencing the dictionary, the dictionary facilitating the selection of handlers by specifying handlers for a particular property value from the policy information.

5. The method of claim 4, wherein the dictionary specifies handlers by reference to other strategies.

6. The method of claim 5, wherein the reference to other strategies comprises reference to a list, the list comprising a list of handlers to be executed.

7. The method of claim 3, wherein at least one of the strategies comprises an ordered strategy, wherein the ordered strategy defines an order for selected handlers to be executed based on particular property values in the policy information.

8. The method of claim 3, wherein at least one of the strategies comprises a plurality of strategies chained together.

9. A system including an execution pipeline which comprises a plurality of handlers, the system configured to optimize execution of handlers in the pipeline, the system comprising:

a computer processor;

a computer memory coupled to the processor, the computer memory comprising computer executable instructions that when executed by the computer processor cause the computer processor to perform the method of claim 1.

10. The system of claim 9, wherein the policy information is registered in one or more strategies with corresponding handlers, wherein the strategies define which handlers are selected based on how the policy information is registered in the strategies.

11. The system of claim 10, wherein at least one of the strategies comprises a dictionary, and wherein selecting handlers comprises referencing the dictionary, the dictionary facilitating the selection of handlers by specifying handlers for a particular property value from the policy information.

12. The system of claim 11, wherein the dictionary specifies handlers by reference to other strategies.

13. The system of claim 12, wherein the reference to other strategies comprises reference to a list, the list comprising a list of handlers to be executed.

14. The system of claim 10, wherein at least one of the strategies comprises an ordered strategy, wherein the ordered strategy defines an order for selected handlers to be executed based on particular property values in the policy information.

* * * * *